(12) United States Patent
Choi et al.

(10) Patent No.: US 11,898,107 B1
(45) Date of Patent: Feb. 13, 2024

(54) SYSTEMS AND METHODS FOR PROCESSING HYDROCARBON FEEDSTOCKS

(71) Applicant: Saudi Arabian Oil Company, Dhahran (SA)

(72) Inventors: Ki-Hyouk Choi, Dhahran (SA); Joo-Hyeong Lee, Dhahran (SA); Mohammed Saad Aldossary, Dhahran (SA); Ali Mahmoud Al-Somali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/067,234

(22) Filed: Dec. 16, 2022

(51) Int. Cl.
*C10G 45/26* (2006.01)
*B01D 11/04* (2006.01)
(Continued)

(52) U.S. Cl.
CPC .......... *C10G 45/26* (2013.01); *B01D 11/0407* (2013.01); *B01D 11/0492* (2013.01); *B01D 17/047* (2013.01); *B01D 19/0068* (2013.01); *B01J 3/008* (2013.01); *B01D 53/02* (2013.01); *C10G 2300/202* (2013.01);
(Continued)

(58) Field of Classification Search
CPC .............. C10G 45/26; C10G 2300/202; C10G 2300/206; C10G 2300/207; C10G 2300/301; C10G 2300/308; C10G 2300/4006; C10G 2300/4012; C10G 2300/4081; B01D 11/0407;
(Continued)

(56) References Cited

U.S. PATENT DOCUMENTS 6,566,410 B1   5/2003   Zaki et al.
7,740,065 B2   6/2010   Choi
(Continued)

FOREIGN PATENT DOCUMENTS

GB   2471862 A   1/2011

OTHER PUBLICATIONS

Kokal, "Crude-Oil Emulsions: A State-Of-The-Art Review", Production & Facilities, 9 pages, Feb. 2005.
(Continued)

*Primary Examiner* — In Suk C Bullock
*Assistant Examiner* — Jason Y Chong
(74) *Attorney, Agent, or Firm* — DINSMORE & SHOHL LLP

(57) ABSTRACT

According to one or more embodiments described herein, a method for processing a hydrocarbon feedstock may include contacting the hydrocarbon feedstock and a product emulsion with supercritical carbon dioxide in a supercritical carbon dioxide extraction unit to form at least an extract emulsion and a pitch emulsion; contacting at least a portion of the pitch emulsion with supercritical water in a supercritical water gasification unit to form a gasified product; separating the gasified product into at least a product gas and the product emulsion, the product emulsion comprising water and one or more hydrocarbons; and recycling at least a portion of the product emulsion to the supercritical carbon dioxide extraction unit. Contacting the product emulsion with the supercritical carbon dioxide may break at least a portion of the product emulsion.

20 Claims, 6 Drawing Sheets

(51) Int. Cl.
*B01J 3/00* (2006.01)
*B01D 17/04* (2006.01)
*B01D 19/00* (2006.01)
*B01D 53/02* (2006.01)

(52) U.S. Cl.
CPC . *C10G 2300/206* (2013.01); *C10G 2300/207* (2013.01); *C10G 2300/301* (2013.01); *C10G 2300/308* (2013.01); *C10G 2300/4006* (2013.01); *C10G 2300/4012* (2013.01); *C10G 2300/4081* (2013.01)

(58) Field of Classification Search
CPC .............. B01D 11/0492; B01D 17/047; B01D 19/0068; B01D 53/02; B01J 3/008
See application file for complete search history.

(56) References Cited

U.S. PATENT DOCUMENTS

| 9,562,198 | B2 | 2/2017 | Yusuf | |
| 2004/0232046 | A1* | 11/2004 | Tanaka | C10G 9/38 422/600 |
| 2017/0166819 | A1* | 6/2017 | Choi | B01D 11/0403 |

OTHER PUBLICATIONS

Liu et al., "Phase equilibria of the CO2-Jiangsu crude oil system and precipitation of heavy components induced by supercritical CO2", Journal of Supercritical Fluids, vol. 16, pp. 27-31, 1999.

Magomedov et al., "Solvent demetallization of heavy petroleum feedstock using supercritical carbon dioxide with modifiers", The Journal of Supercritical Fluids, vol. 119, pp. 150-158, 2017.

Magomedov et al., "Solvent deasphalting of vacuum residue using carbon dioxide-toluene binary mixture", Journal of CO2 Utilization, vol. 40, 101206, 2020.

Okolie et al., "A review on subcritical and supercritical water gasification of biogenic, polymeric and petroleum wastes to hydrogen-rich synthesis gas", Renewable and Sustainable Energy Reviews, vol. 119, 109546, 2020.

Palova et al., Supercritical Fluid Application in the Oil and Gas Industry: A Comprehensive Review, Sustainability, vol. 14, 27 pages, 2022.

Ramsey et al., "Mini-Review: Green sustainable processes using supercritical fluid carbon dioxide", Journal of Environmental Sciences, vol. 21, pp. 720-726, 2009.

Sako et al., "Solubility Measurement in Crossover Region of Supercritical CO2-Naphthalene-Phenanthrene System", Sekiyu Gakkaishi, vol. 37, No. 3, pp. 321-327, 1994.

Zaki et al., "A Novel Process for Demulsification of Water-in-Crude Oil Emulsions by Dense Carbon Dioxide", Ind. Eng. Chem. Res., vol. 42, pp. 6661-6672, 2003.

* cited by examiner

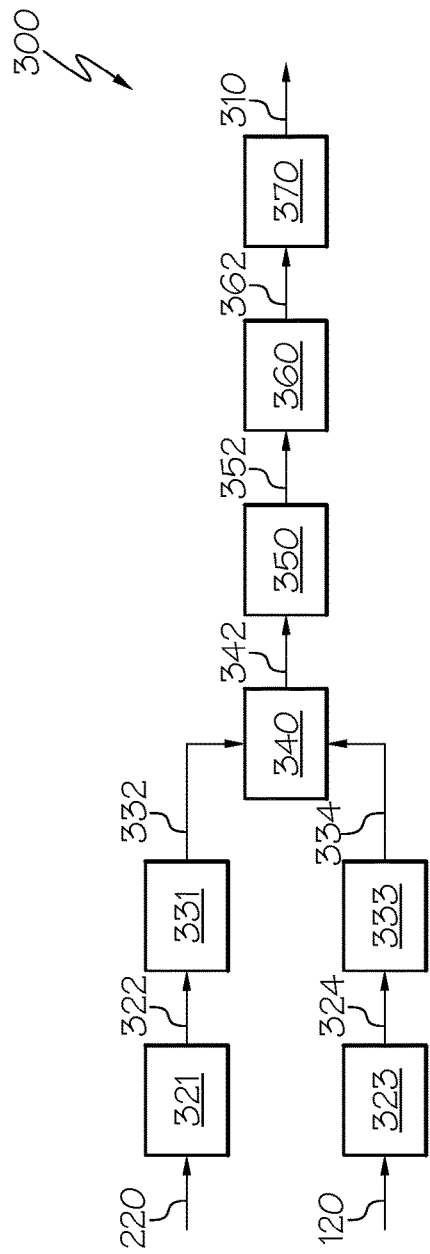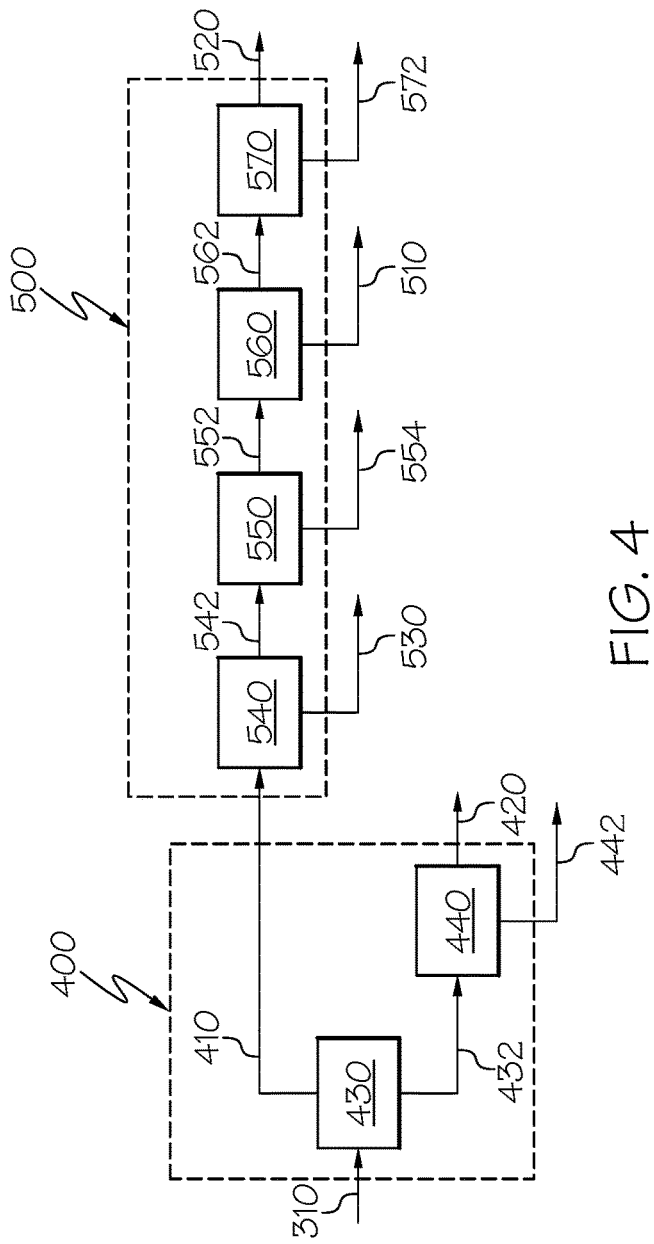

SYSTEMS AND METHODS FOR PROCESSING HYDROCARBON FEEDSTOCKS

TECHNICAL FIELD

Embodiments of the present disclosure generally relate to chemical processing and, more specifically, to systems and methods for processing hydrocarbon feedstocks.

BACKGROUND

Various hydrocarbon fractions may be treated to remove impurities before being introduced to conventional refining processes. For example, hydrocarbon fractions may be treated to remove heavy residue, which may include asphaltenes and other impurities, from the crude oil fractions. Decreasing the amount of impurities and asphaltenes before being introduced into traditional refining processes may result in reduced energy, hydrogen, and catalyst consumption in various refining operations. Accordingly, there is a need for improved methods and processes for removing impurities and asphaltenes from hydrocarbon fractions.

Additionally, hydrogen is one of the most demanded reagents in crude oil refining processes. For example, hydrogen is an important feedstock for hydroprocessing units. Conventional methods for producing hydrogen for use in a refinery include naphtha reforming, steam methane reforming, partial oxidation of residue, and autothermal reforming of distillates. However, the production of hydrogen from heavy residue by conventional processes may be disadvantageous because of the relatively low hydrogen to carbon ratio of heavy residue and due to limited miscibility of steam and heavy residue. Accordingly, there is a need for improved systems and processes for producing hydrogen from heavy residue.

SUMMARY

Embodiments of the present disclosure are directed to systems and methods for processing hydrocarbon feedstocks that may address one or more of these problems. Embodiments of the present disclosure include methods for processing hydrocarbon feedstocks that comprise a supercritical carbon dioxide extractions step upstream of a supercritical water gasification step. Heavy fractions of hydrocarbon feedstocks that include impurities such as asphaltenes may be separated from light hydrocarbon fractions using supercritical carbon dioxide extraction. The heavy fraction may then be used to produce hydrogen by a supercritical water gasification process. However, the supercritical water gasification process may result in an emulsion comprising hydrocarbons and water. Supercritical carbon dioxide may be used to break such emulsions. Embodiments of the present disclosure include recycling at least a portion of this emulsion back to the supercritical carbon dioxide extraction step so that the emulsion could be broken and light hydrocarbons may be extracted from the emulsion. Accordingly, simultaneous extraction and demulsification may take place in the supercritical carbon dioxide extraction unit. This recycling step may reduce the need for process equipment downstream of the supercritical water gasification step to break the emulsion. Additionally, passing the emulsion back to the supercritical carbon dioxide extraction unit may allow water to be recycled back to the supercritical water gasification unit, which may reduce the amount of make-up water that is utilized by the supercritical water gasification unit.

According to one or more embodiments described herein, a method for processing a hydrocarbon feedstock may comprise contacting the hydrocarbon feedstock and a product emulsion with supercritical carbon dioxide in a supercritical carbon dioxide extraction unit to form at least an extract emulsion and a pitch emulsion; contacting at least a portion of the pitch emulsion with supercritical water in a supercritical water gasification unit to form a gasified product; separating the gasified product into at least a product gas and the product emulsion, the product emulsion comprising water and one or more hydrocarbons; and recycling at least a portion of the product emulsion to the supercritical carbon dioxide extraction unit, wherein contacting the product emulsion with the supercritical carbon dioxide breaks at least a portion of the product emulsion.

According to one or more embodiments described herein, a system for processing a hydrocarbon feedstock may comprise a supercritical carbon dioxide extraction unit configured to contact a hydrocarbon feedstock with supercritical carbon dioxide to form at least an extract emulsion and a pitch emulsion; a supercritical water gasification unit in fluid communication with the supercritical carbon dioxide extraction unit, the supercritical water gasification unit configured to contact the pitch emulsion with supercritical water to form a gasified product; and a degassing unit in fluid communication with the supercritical water gasification unit, the degassing unit configured to separate the gasified product into at least a product gas and a product emulsion, wherein the degassing unit is in fluid communication with the supercritical carbon dioxide extraction unit such that at least a portion of the product emulsion is recycled to the supercritical carbon dioxide extraction unit.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 3 schematically depicts a supercritical water gasification unit according to one or more embodiments described herein;

FIG. 4 schematically depicts a separator according to one or more embodiments described herein;

Figure 1:
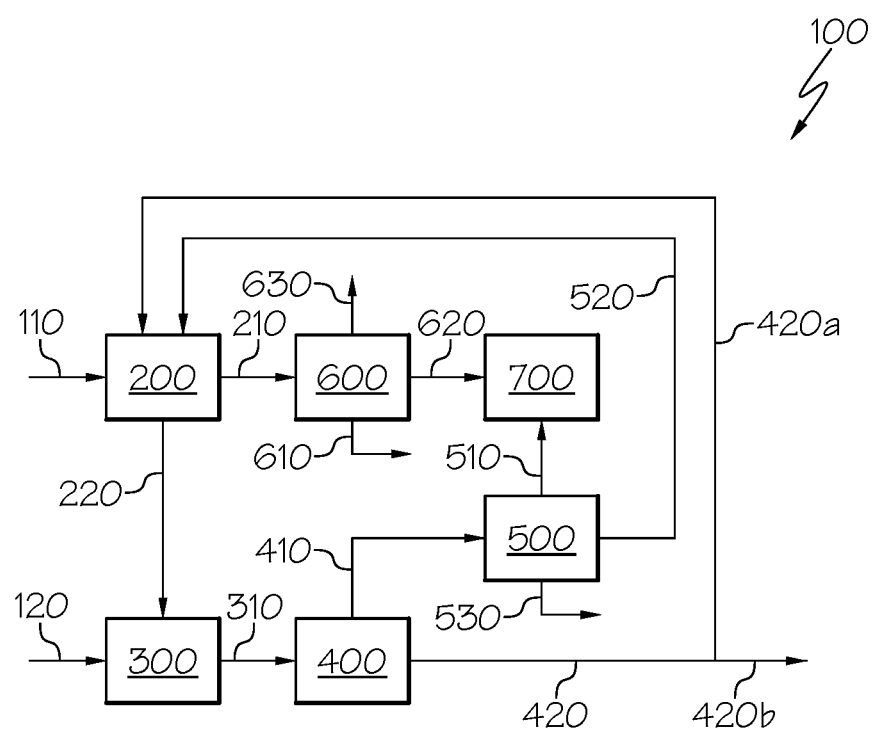
FIG. 1 schematically depicts a system for processing a hydrocarbon feedstock according to one or more embodiments described herein.

For the purpose of describing the simplified schematic illustrations and descriptions of the relevant figures, the numerous valves, sensors, electronic controllers and the like that may be employed and well known to those of ordinary skill in the art of certain chemical processing operations are not included. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to systems and methods for treating hydrocarbon feedstocks. According to embodiments described herein, methods for processing hydrocarbon feedstocks may comprise contacting a hydrocarbon feedstock with supercritical carbon dioxide in a supercritical carbon dioxide extraction unit to form an extract emulsion and a pitch emulsion. The pitch emulsion may be contacted with supercritical water in a supercritical water gasification unit to form a gasified product. The gasified product may be separated in to a product gas and a product emulsion. At least a portion of the product emulsion may be recycled to the supercritical carbon dioxide extraction unit where contacting the product emulsion with the supercritical carbon dioxide breaks the product emulsion.

Referring now to FIG. 1, a system 100 for processing a hydrocarbon feedstock 110 is schematically depicted. In one or more embodiments, a method for processing a hydrocarbon feedstock 110 may be performed using system 100. In one or more embodiments, the method for processing a hydrocarbon feedstock 110 may include contacting the hydrocarbon feedstock 110 and a product emulsion 420$a$ with supercritical carbon dioxide in a supercritical carbon dioxide extraction unit 200 to form at least an extract emulsion 210 and a pitch emulsion 220. At least a portion of the pitch emulsion 220 may be contacted with supercritical water in a supercritical water gasification unit 300 to form a gasified product 310. The gasified product 310 may be separated into at least a product gas 410 and a product emulsion 420 in a degassing unit 400. At least a portion of the product emulsion 420$a$ may be recycled to the supercritical carbon dioxide extraction unit 200, so the product emulsion 420$a$ may be contacted with supercritical carbon dioxide to break the emulsion.

In one or more embodiments, the hydrocarbon feedstock 110 may comprise hydrocarbons derived from petroleum, coal, biomass, or plastic. It should be understood that "derived from" may mean that the hydrocarbon feedstock may comprise any hydrocarbon fraction that may be formed during processing of petroleum, coal, biomass, or plastic. For example, without limitation, the hydrocarbon feedstock 110 may comprise crude oil or a fraction of crude oil. Suitable fractions of crude oil may include distilled crude oil, residue oil, topped crude oil, atmospheric residue, and vacuum residue. In one or more embodiments, the hydrocarbon feedstock 110 may comprise product streams from one or more refinery or chemical processes, such as from steam cracking processes. In one or more embodiments, the hydrocarbon feedstock 110 may comprise liquefied coal, liquid products recovered from tar sands, bitumen, oil shale, or asphaltene. In one or more embodiments, the hydrocarbon feedstock 110 may comprise hydrocarbons produced from biomass or hydrocarbons produced from the pyrolysis of plastics. It should be understood that the hydrocarbon feedstock may comprise any combination of hydrocarbons described hereinabove.

In one or more embodiments, the hydrocarbon feedstock 110 may comprise greater than or equal to 0.1 wt. % asphaltene, when measured according to ASTM D6560, Standard Test Method for Determination of Asphaltenes (Heptane Insolubles) in Crude Petroleum and Petroleum Products. For example, the hydrocarbon feedstock 110 may comprise from 0.1 wt. % to 40 wt. % asphaltene. For example, without limitation, the hydrocarbon feedstock 110 may comprise asphaltene from 0.1 wt. % to 40 wt. %, from 0.5 wt. % to 40 wt. %, from 1 wt. % to 40 wt. %, from 5 wt. % to 40 wt. %, from 10 wt. % to 40 wt. %, from 15 wt. % to 40 wt. %, from 20 wt. % to 40 wt. %, from 25 wt. % to 40 wt. %, from 30 wt. % to 40 wt. %, from 35 wt. % to 40 wt. %, from 0.1 wt. % to wt. %, from 0.1 wt. % to 30 wt. %, from 0.1 wt. % to 25 wt. %, from 0.1 wt. % to 20 wt. %, from wt. % to 15 wt. %, from 0.1 wt. % to 10 wt. %, from 0.1 wt. % to 5 wt. %, from 0.1 wt. % to 1 wt. %, from 0.1 wt. % to 0.5 wt. %, or any combination or subset of these ranges. In one or more embodiments, the hydrocarbon feedstock may comprise from 0.7 wt. % to 28 wt. % asphaltene.

In one or more embodiments, the hydrocarbon feedstock 110 may have an American Petroleum Institute (API) gravity from −5° to 50°, measured by ASTM D287. In one or more embodiments, the hydrocarbon feedstock 110 may have an API gravity from −5° to 50°, from 0° to 50°, from 5° to 50°, from 10° to 50°, from 15° to 50°, from 20° to 50°, from 25° to 50°, from 30° to 50°, from 35° to 50°, from 40° to 50°, from 45° to 50°, from −5° to 45°, from −5° to 40°, from −5° to 35°, from −5° to 30°, from −5° to 25°, from −5° to 20°, from −5° to 15°, from −5° to 10°, from −5° to 5°, from −5° to 0°, or any combination or subset of these ranges. In one or more embodiments, the hydrocarbon feedstock may have an API gravity from −1° to 32°.

Methods for processing hydrocarbon feedstocks 110 described herein include contacting the hydrocarbon feedstocks 110 and a product emulsion 420a with supercritical carbon dioxide to form an extract emulsion 210 and a pitch emulsion 220. As described herein "supercritical carbon dioxide" refers to carbon dioxide that is at a temperature and a pressure above the critical temperature and the critical pressure of carbon dioxide, 31.1 degrees Celsius (° C.) and 7.28 megapascals (MPa) respectively. Without intending to be bound by theory, supercritical carbon dioxide may be an attractive solvent due to its relatively low critical temperature and pressure. Furthermore, various properties of supercritical carbon dioxide, such as polarity, density, and viscosity, may be tuned by adjusting the temperature and pressure of the supercritical carbon dioxide. Without intending to be bound by theory, light fractions of hydrocarbon feedstocks may be soluble in supercritical carbon dioxide, so supercritical carbon dioxide may be used to separate a hydrocarbon feedstock, such as crude oil, into an extract (a light fraction) and a pitch (a heavy fraction) that is insoluble in supercritical carbon dioxide. Furthermore, without intending to be bound by theory, the solubility of some heavier hydrocarbons in supercritical carbon dioxide may be increased by adding a modifier to the supercritical carbon dioxide. For example, the solubility of maltenes, which may include paraffinic, napthenic, olefinic, and aromatic compounds, in supercritical carbon dioxide may be enhanced by the use of a modifier. Suitable modifiers may include benzene, toluene, and xylene.

Furthermore, supercritical carbon dioxide may be suitable for destabilizing and breaking emulsions comprising oil and water, such as, but not limited to, water-in-oil emulsions. As described herein, breaking an emulsion may comprise at least partially inducing phase separation between a continuous phase and a dispersed phase of an emulsion. Without intending to be bound by theory, emulsions comprising water and oil may comprise an interfacial film comprising large, polar molecules, such as asphaltene and resin. Supercritical carbon dioxide may cause these large, polar molecules to flocculate in the interfacial film, which may eventually disrupt the film and break the emulsion. This may allow for emulsions between oil and water to be broken without the use of a chemical demulsifier.

Without intending to be bound by theory, contacting the hydrocarbon feedstock 110 and the product emulsion 420a with supercritical carbon dioxide in the same vessel may allow for simultaneous emulsion breaking of the product emulsion 420a and extraction of light hydrocarbons from both the hydrocarbon feedstock 110 and the product emulsion 420a. This may reduce the overall footprint of the system 100 as a separate system for breaking the product emulsion 420a may not be necessary. Additionally, water recovered from breaking the product emulsion 420a in the supercritical water extraction unit 200 may be passed to the supercritical water gasification unit 300.

In one or more embodiments, contacting the hydrocarbon feedstock 110 and the product emulsion 420a with supercritical carbon dioxide in the supercritical carbon dioxide extraction unit 200 may be contacted at a temperature and pressure above the critical temperature and the critical pressure of carbon dioxide. In one or more embodiments, contacting the hydrocarbon feedstock 110 and the product emulsion 420a with the supercritical carbon dioxide may occur at a pressure from 7.5 megapascals gauge (MPag) to 15 MPag. For example, contacting the hydrocarbon feedstock 110 and the product emulsion 420a with the supercritical carbon dioxide may occur at a pressure from 7.5 MPag to 15 MPag, from 8 MPag to 15 MPag, 9 MPag to 15 MPag, 10 MPag to 15 MPag, 11 MPag to 15 MPag, 12 MPag to 15 MPag, 13 MPag to 15 MPag, 14 MPag to 15 MPag, 7.5 MPag to 14 MPag, 7.5 MPag to 13 MPag, 7.5 MPag to 12 MPag, 7.5 MPag to 11 MPag, 7.5 MPag to 10 MPag, 7.5 MPag to 9 MPag, 7.5 MPag to 8 MPag, or any combination or subset of these ranges.

In one or more embodiments, contacting the hydrocarbon feedstock 110 and the product emulsion 420a with the supercritical carbon dioxide may occur at a temperature of from 35° C. to 250° C. For example, contacting the hydrocarbon feedstock 110 and the product emulsion 420a with the supercritical carbon dioxide may occur at a temperature of from 35° C. to 250° C., from 50° C. to 250° C., from 75° C. to 250° C., from 100° C. to 250° C., from 125° C. to 250° C., from 150° C. to 250° C., from 175° C. to 250° C., from 200° C. to 250° C., from 225° C. to 250° C., from 35° C. to 225° C., from 35° C. to 200° C., from 35° C. to 175° C., from 35° C. to 150° C., from 35° C. to 125° C., from 35° C. to 100° C., from 35° C. to 75° C., from 35° C. to 50° C., or any combination or subset of these ranges.

In one or more embodiments, the supercritical carbon dioxide may comprise an additive comprising one or more of benzene, toluene, xylene, and trimethyl benzene. Without intending to be bound by theory, the additive may enhance the extraction performance of the supercritical carbon dioxide and increase the yield of extract emulsion.

Figure 2:
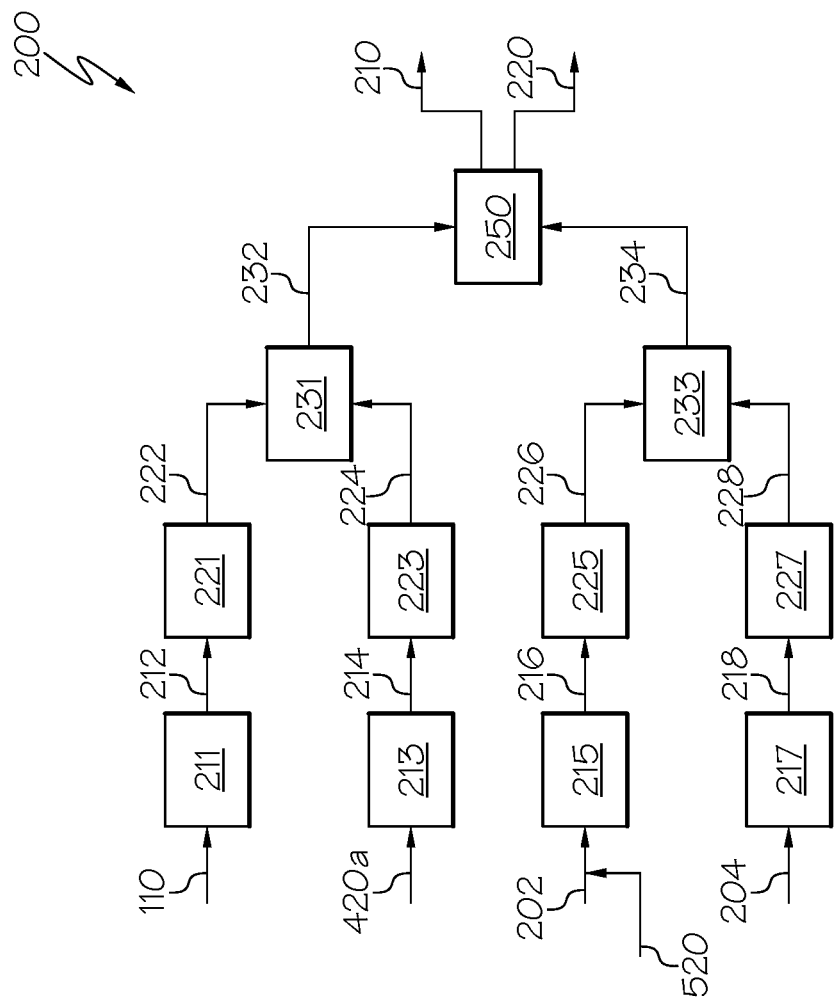
FIG. 2 schematically depicts supercritical carbon dioxide extraction unit according to one or more embodiments described herein.

Referring now to FIG. 2, an embodiment of a supercritical carbon dioxide extraction unit 200 of FIG. 1 is depicted in greater detail. In the supercritical carbon dioxide extraction system 200, carbon dioxide 202 may be heated and pressurized to form supercritical carbon dioxide 234. Any suitable source of carbon dioxide may be used. In one or more embodiments, at least a portion of the carbon dioxide 202 is carbon dioxide 520 recycled to the supercritical carbon dioxide extraction system 200 from gas separator 500.

The carbon dioxide 202 may be pressurized by a carbon dioxide pump 215 to form pressurized carbon dioxide 216. Carbon dioxide pump 215 may be any suitable pump for pressurizing carbon dioxide 202 to a pressure greater than the critical pressure of carbon dioxide, 7.28 MPag. In one or more embodiments, the pressure of the pressurized carbon dioxide 216 may be from 7.5 MPag to 15 MPag. For example, the pressure of the pressurized carbon dioxide 216 may be from 7.5 MPag to 15 MPag, from 8.5 MPag to 15 MPag, from 9.5 MPag to 15 MPag, from MPag to 15 MPag, from 11.5 MPag to 15 MPag, from 12.5 MPag to 15 MPag, from 13.5 MPag to 15 MPag, from 14.5 MPag to 15 MPag, from 7.5 MPag to 14 MPag, from 7.5 MPag to 13 MPag, from 7.5 MPag to 12 MPag, from 7.5 MPag to 11 MPag, from 7.5 MPag to 10 MPag, from 7.5 MPag to 9 MPag, from 7.5 MPag to 8 MPag, or any combination or subset of these ranges.

The pressurized carbon dioxide 216 may be heated by a carbon dioxide preheater 225 to form supercritical carbon dioxide 226. The carbon dioxide preheater 225 may be any heater suitable to raise the temperature of the pressurized carbon dioxide 216 to a temperature greater than the critical temperature of carbon dioxide, 31.1° C. For example, the carbon dioxide preheater 225 may be a natural gas fired heater, a heat exchanger, or an electric heater. In one or more embodiments, the supercritical carbon dioxide 226 may have a temperature from 35° C. to 250° C. For example, the temperature of the supercritical carbon dioxide 226 may be from 35° C. to 250° C., from 50° C. to 250° C., from 75° C. to 250° C., from 100° C. to 250° C., from 125° C. to 250° C., from 150° C. to 250° C., from 175° C. to 250° C., from 200° C. to 250° C., from 225° C. to 250° C., from 35° C. to 225° C., from 35° C. to 200° C., from 35° C. to 175° C., from 35° C. to 150° C., from 35° C. to 125° C., from 35° C. to 100° C., from 35° C. to 75° C., from 35° C. to 50° C., or any combination or subset of these ranges.

In one or more embodiments, an additive 204 comprising one or more of benzene, toluene, xylene, and trimethyl benzene may be added to the supercritical carbon dioxide 226. The additive 204 may be pressurized in an additive pump 217 to form a pressurized additive 218. Additive pump 217 may be any suitable pump for pressurizing additive 204 to a pressure greater than the critical pressure of carbon dioxide, 7.28 MPag. In one or more embodiments, the pressure of the pressurized additive 218 may be from 7.5 MPag to 15 MPag. For example, the pressure of the pressurized carbon dioxide 216 may be from 7.5 MPag to 15 MPag, from 8.5 MPag to 15 MPag, from 9.5 MPag to 15 MPag, from 10.5 MPag to 15 MPag, from 11.5 MPag to 15 MPag, from 12.5 MPag to 15 MPag, from 13.5 MPag to 15 MPag, from 14.5 MPag to 15 MPag, from 7.5 MPag to 14 MPag, from 7.5 MPag to 13 MPag, from 7.5 MPag to 12 MPag, from 7.5 MPag to 11 MPag, from 7.5 MPag to 10 MPag, from 7.5 MPag to 9 MPag, from 7.5 MPag to 8 MPag, or any combination or subset of these ranges.

The pressurized additive 218 may be heated by an additive preheater 227 to form a heated, pressurized additive 228. The additive preheater 227 may be any heater suitable to raise the temperature of the pressurized additive 218 to a temperature greater than the critical temperature of carbon dioxide, 31.1° C. For example, the additive preheater 227 may be a natural gas fired heater, a heat exchanger, or an electric heater. In one or more embodiments, the heated, pressurized additive 228 may have a temperature from 35° C. to 250° C. For example, the temperature of the heated, pressurized additive 228 may be from 35° C. to 250° C., from 50° C. to 250° C., from 75° C. to 250° C., from 100° C. to 250° C., from 125° C. to 250° C., from 150° C. to 250° C., from 175° C. to 250° C., from 200° C. to 250° C., from 225° C. to 250° C., from 35° C. to 225° C., from 35° C. to 200° C., from 35° C. to 175° C., from 35° C. to 150° C., from 35° C. to 125° C., from 35° C. to 100° C., from 35° C. to 75° C., from 35° C. to 50° C., or any combination or subset of these ranges.

The heated, pressurized additive 228 may be mixed with the supercritical carbon dioxide 226 in mixer 233 to form a supercritical carbon dioxide composition 234. Mixer 233 may be any mixer suitable for mixing supercritical carbon dioxide 226 with a heated, pressurized additive 228, including but not limited to, comprise an inline mixer, a T fitting, an agitator equipped vessel, an ultrasonic mixer or a combination of these.

Still referring to FIG. 2, the hydrocarbon feedstock 110 may be heated and pressurized to form a heated, pressurized feedstock 222. In one or more embodiments, the hydrocarbon feedstock 110 may be pressurized by a feedstock pump 211 to form pressurized hydrocarbon feedstock 212. Feedstock pump 211 may be any suitable pump for pressurizing the hydrocarbon feedstock 110 to a pressure greater than the critical pressure of carbon dioxide, 7.28 MPag. In one or more embodiments, the pressure of the pressurized feedstock 212 may be from 7.5 MPag to 15 MPag. For example, the pressure of the pressurized carbon dioxide 216 may be from 7.5 MPag to 15 MPag, from 8.5 MPag to 15 MPag, from 9.5 MPag to 15 MPag, from 10.5 MPag to 15 MPag, from 11.5 MPag to 15 MPag, from 12.5 MPag to 15 MPag, from 13.5 MPag to 15 MPag, from 14.5 MPag to 15 MPag, from 7.5 MPag to 14 MPag, from 7.5 MPag to 13 MPag, from 7.5 MPag to 12 MPag, from 7.5 MPag to 11 MPag, from 7.5 MPag to 10 MPag, from 7.5 MPag to 9 MPag, from 7.5 MPag to 8 MPag, or any combination or subset of these ranges.

The pressurized feedstock 212 may be heated by a feedstock preheater 221 to form a heated, pressurized feedstock 222. The feedstock preheater 221 may be any heater suitable to raise the temperature of the pressurized feedstock 212 to a temperature greater than the critical temperature of carbon dioxide, 31.1° C. For example, the feedstock preheater 221 may be a natural gas fired heater, a heat exchanger, or an electric heater. In one or more embodiments, the heated, pressurized feedstock 222 may have a temperature from 35° C. to 250° C. For example, the temperature of the heated, pressurized additive 228 may be from 35° C. to 250° C., from 50° C. to 250° C., from 75° C. to 250° C., from 100° C. to 250° C., from 125° C. to 250° C., from 150° C. to 250° C., from 175° C. to 250° C., from 200° C. to 250° C., from 225° C. to 250° C., from 35° C. to 225° C., from 35° C. to 200° C., from 35° C. to 175° C., from 35° C. to 150° C., from 35° C. to 125° C., from 35° C. to 100° C., from 35° C. to 75° C., from 35° C. to 50° C., or any combination or subset of these ranges.

In one or more embodiments, the product emulsion 420a may be heated and pressurized to form a heated, pressurized emulsion 224. In one or more embodiments, the product emulsion 420a may be pressurized by an emulsion pump 213 to form pressurized emulsion 214. Emulsion pump 213 may be any suitable pump for pressurizing the product emulsion 420a to a pressure greater than the critical pressure of carbon dioxide, 7.28 MPag. In one or more embodiments, the pressure of the pressurized emulsion 214 may be from 7.5 MPag to 15 MPag. For example, the pressure of the pressurized carbon dioxide 216 may be from 7.5 MPag to 15 MPag, from 8.5 MPag to 15 MPag, from 9.5 MPag to 15 MPag, from 10.5 MPag to 15 MPag, from 11.5 MPag to 15 MPag, from 12.5 MPag to 15 MPag, from 13.5 MPag to 15 MPag, from 14.5 MPag to 15 MPag, from 7.5 MPag to 14 MPag, from 7.5 MPag to 13 MPag, from 7.5 MPag to 12 MPag, from 7.5 MPag to 11 MPag, from 7.5 MPag to 10 MPag, from 7.5 MPag to 9 MPag, from 7.5 MPag to 8 MPag, or any combination or subset of these ranges.

The pressurized emulsion 214 may be heated by an emulsion preheater 223 to form a heated, pressurized emulsion 224. The emulsion preheater 223 may be any heater suitable to raise the temperature of the pressurized emulsion 214 to a temperature greater than the critical temperature of carbon dioxide, 31.1° C. For example, the emulsion preheater 223 may be a natural gas fired heater, a heat exchanger, or an electric heater. In one or more embodiments, the heated, pressurized emulsion 224 may have a temperature from 35° C. to 250° C. For example, the temperature of the heated, pressurized additive 228 may be from 35° C. to 250° C., from 50° C. to 250° C., from 75° C. to 250° C., from 100° C. to 250° C., from 125° C. to 250° C., from 150° C. to 250° C., from 175° C. to 250° C., from 200° C. to 250° C., from 225° C. to 250° C., from 35° C. to 225° C., from 35° C. to 200° C., from 35° C. to 175° C., from 35° C. to 150° C., from 35° C. to 125° C., from 35° C. to 100° C., from 35° C. to 75° C., from 35° C. to 50° C., or any combination or subset of these ranges.

The heated, pressurized feedstock 222 may be mixed with the heated, pressurized emulsion 224 in mixer 231 to form a mixed composition 232. Mixer 231 may be any mixer suitable for mixing the heated, pressurized feedstock 222 with the heated, pressurized emulsion 224, including but not limited to, comprise an inline mixer, a T fitting, an agitator equipped vessel, an ultrasonic mixer or a combination of these.

The mixed composition 232 comprising the heated, pressurized feedstock 222 and the heated, pressurized emulsion 224 may be mixed with the supercritical carbon dioxide composition 234 either in a extractor 250 or upstream of extractor 250. Extractor 250 may be any vessel suitable for contacting the mixed composition 232 with the supercritical carbon dioxide composition 234. In one or more embodiments, the extractor 250 may comprise an extraction tower. Contacting the mixed composition 232 and the supercritical carbon dioxide composition 234 in the extractor 250 may result in the formation of an extract emulsion 210 and a pitch emulsion 220. As described herein, the extract emulsion 210 may refer to a light fraction exiting the supercritical carbon dioxide extraction unit 200 and the pitch emulsion may refer to a heavy fraction exiting the supercritical carbon dioxide extraction unit 200. The extract emulsion 210 and the pitch emulsion 220 may be passed from the supercritical carbon dioxide extraction unit 200.

It should be understood that the supercritical carbon dioxide extraction unit depicted in FIG. 2 is merely one embodiment of a supercritical carbon dioxide extraction unit 200 that may be utilized in the system 100 for processing a hydrocarbon feedstock described in the present disclosure. It is contemplated that variations on the supercritical carbon dioxide extraction unit 200 depicted in FIG. 2 may also be suitable for use in the system 100 for processing hydrocarbon feedstock described herein. Furthermore, it should be understood that the system 100 for processing hydrocarbon feedstocks described herein is not necessarily limited to the use of the exact supercritical carbon dioxide extraction unit 200 depicted in FIG. 2.

Referring now to FIGS. 1 and 2, in one or more embodiments, the extract emulsion may comprise hydrocarbons, water, and carbon dioxide. In one or more embodiments, the extract emulsion 210 may comprise from 0 wt. % to 1 wt. % asphaltene, when measured according to ASTM D6560, Standard Test Method for Determination of Asphaltenes (Heptane Insolubles) in Crude Petroleum and Petroleum Products. For example, the extract emulsion 210 may comprise from 0 wt. % to 1 wt. % asphaltene, from 0.1 wt. % to 1 wt. % asphaltene, from 0.2 wt. % to 1 wt. % asphaltene, from 0.4 wt. % to 1 wt. % asphaltene, from 0.6 wt. % to 1 wt. % asphaltene, from 0.8 wt. % to 1 wt. % asphaltene, from 0 wt. % to 0.8 wt. % asphaltene, from 0 wt. % to 0.6 wt. % asphaltene, from 0 wt. % to 0.4 wt. % asphaltene, from 0 wt. % to 0.2 wt. % asphaltene, from 0 wt. % to 0.1 wt. % asphaltene, or any combination or subset of these ranges.

In one or more embodiments, the pitch emulsion 220 may comprise greater than 1 wt. % asphaltene, when measured according to ASTM D6560, Standard Test Method for Determination of Asphaltenes (Heptane Insolubles) in Crude Petroleum and Petroleum Products. For example, the pitch emulsion 220 may comprise from 1 wt. % to 50 wt. % asphaltene, from 10 wt. % to 50 wt. % asphaltene, from 20 wt. % to 50 wt. % asphaltene, from 30 wt. % to 50 wt. % asphaltene, from 40 wt. % to 50 wt. % asphaltene, from 1 wt. % to 40 wt. % asphaltene, from 1 wt. % to 30 wt. % asphaltene, from 1 wt. % to 20 wt. % asphaltene, from 1 wt. % to 10 wt. % asphaltene, or any combination or subset of these ranges.

Referring again to FIG. 1, in one or more embodiments, the extract emulsion 210 may be passed to separator 600. Separator 600 may be configured to separate the extract emulsion 210 into a stream comprising water 610, a stream comprising liquid hydrocarbons 620, and a stream comprising carbon dioxide 630. The separator 600 may comprise one or more separation units, including but not limited to a gas/liquid separators and an oil/water separators. Examples of gas/liquid separators may include a flash drum or a flash column. Examples of oil/water separators may include a phase separator or an API separator. In one or more embodiments, at least a portion of the carbon dioxide 630 may be recycled to the supercritical carbon dioxide extraction unit 200. In one or more embodiments, liquid hydrocarbons 620 may comprise less asphaltene than hydrocarbon feed 110. In one or more embodiments, the liquid hydrocarbons 620 may have a greater hydrogen content than the hydrocarbon feed 110. Without intending to be bound by theory, these properties may allow the liquid hydrocarbons 620 to be refined more easily than hydrocarbon feed 110.

In one or more embodiments, the liquid hydrocarbons 620 may be used as a feedstock or a portion of a feedstock in one or more processes included in refinery 700. As described herein, refinery 700 may include one or more unit operations for processing hydrocarbons. In one or more embodiments, refinery 700 may comprise one or more of crude distillation units, a vacuum distillation units, hydrotreating units, hydrocracking units, catalytic cracking units, catalytic reforming units, isomerization units, alkylation units, coking units, and visbreaking units. In one or more embodiments, the feedstock for one or more of the unit operations of refinery 700 may comprise hydrocarbons 620. In some embodiments, the feedstock for one or more unit operations of the refinery 700 may comprise crude oil, residue, liquid hydrocarbons 620, or combinations thereof. Without intending to be bound by theory, using liquid hydrocarbons 620 as a feedstock to one or more unit operations in refinery 700 may result in less asphaltenic hydrocarbons being processed in the unit operations of refinery 700. Reducing the amount of asphaltenic hydrocarbons processed in refinery 700 may result in reduced consumption of energy, hydrogen, and catalyst in refinery 700. Reducing the amount of asphaltenic hydrocarbons processed in refinery 700 may also result in increased yield of upgraded products from the unit operations in refinery 700.

Referring still to FIG. 1, the system for processing hydrocarbon feedstock may comprise a supercritical water gasification unit 300 in fluid communication with the supercritical carbon dioxide extraction unit 200. The supercritical water gasification unit 300 may be configured to contact the pitch emulsion 220 with supercritical water to form a gasified product 310.

As describe herein, a "supercritical water" refers to water at a pressure and a temperature greater than that of its critical pressure and critical temperature, 22.064 MPa and 374° C. respectively. At a temperature and pressure greater than the critical temperature and pressure, the liquid and gas phase boundary may disappear, and the supercritical water may have characteristics of both fluid and gaseous substances. Without intending to be bound by theory, supercritical water may be a good reaction medium for the gasification of hydrocarbons because supercritical water may have good miscibility with hydrocarbons and the "cage effect" may stabilize radicals formed during the gasification process to suppress the recombination of the radicals. Without intending to be bound by theory, at temperatures less than about 500° C., hydrocarbons contacted with supercritical water may be converted by cracking, isomerizing, dealkylating, desulfurizing, demetallizing, denitrogenating, deoxygenating, dimerizing, and alkylating reactions. In such reactions, a portion of water may be consumed as a reactant such that CO, $CO_2$, and hydrogen are produced. At temperature of greater than about 500° C., a reforming reaction may be the dominant reaction when hydrocarbons are contacted with supercritical water. In a reforming reaction, hydrocarbons may be reacted with water to form CO, $CO_2$, and hydrogen.

Without intending to be bound by theory, contacting the pitch emulsion 220 with supercritical water at conditions where a reforming reaction is the dominant reaction mechanism may provide advantages over conventional steam reforming reactions for the production of hydrogen. For example, without limitation, supercritical water may be more miscible with the pitch emulsion 220 that steam, and gas molecules may have a high diffusion coefficient in supercritical water, which may reduce mass transfer limitations in the reforming reaction. Additionally, a water-gas shift reaction is an exothermic reaction, limited by equilibrium. Although the reaction rate increases as temperature increases, conversion of carbon monoxide to hydrogen may be limited by equilibrium. Because of this limitation, conventional steam reforming may not convert carbon monoxide to carbon dioxide through a water gas shift reaction at reaction condition. However, when supercritical water is used in a supercritical water gas shift reaction, an increased density of water over a conventional water gas shift reaction may result in conversion of carbon monoxide to carbon dioxide. Furthermore, the supercritical water gasification unit 300 may not require an external supply of oxygen, which may reduce capital and operating costs.

In one or more embodiments, the pitch emulsion 220 may be contacted with supercritical water at a temperature greater than the critical temperature of water, 374° C. In one or more embodiments, the pitch emulsion 220 may be contacted with supercritical water at a temperature from 450° C. to 800° C. For example, the pitch emulsion 220 may be contacted with supercritical water at a temperature from 450° C. to 800° C., from 500° C. to 800° C., from 550° C. to 800° C., from 600° C. to 800° C., from 650° C. to 800° C., from 700° C. to 800° C., from 750° C. to 800° C., from 450° C. to 750° C., from 450° C. to 700° C., from 450° C. to 650° C., from 450° C. to 600° C., from 450° C. to 550° C., from 450° C. to 500° C., or any combination or subset of these ranges.

In one or more embodiments, the pitch emulsion 220 may be contacted with the supercritical water at a pressure greater that the critical pressure of water, 22.064 MPa. In one or more embodiments, the pitch emulsion 220 may be contacted with the supercritical water at a pressure from 23 MPa to 30 MPa. For example, the pitch emulsion 220 may be contacted with the supercritical water at a pressure from 23 MPa to 30 MPa, from 25 MPa to 30 MPa, from 27 MPa to 30 MPa, from 29 MPa to 30 MPa, from 23 MPa to 28 MPa, from 23 MPa to 26 MPa, from 23 MPa to 24 MPa, or any combination or subset of these ranges.

Referring now to FIG. 3, an embodiment of a supercritical water gasification unit 300 of FIG. 1 is depicted in greater detail. In the supercritical water gasification unit 300, water 120 may be heated and pressurized to form supercritical water 334. Any suitable water source may be used. For example, without limitation, the water 120 may comprise demineralized water, distilled water, boiler feed water, or deionized water. In one or more embodiments, the water 120 may have a conductivity of less than 10 microsiemens/centimeter ($\mu$S/cm). For example, without limitation, the water 302 may have a conductivity of less than 10 $\mu$S/cm, less than 8 $\mu$S/cm, less than 6 $\mu$S/cm, less than 4 $\mu$S/cm, less than 2 $\mu$S/cm, less than 1 $\mu$S/cm, less than 0.9 $\mu$S/cm, less than 0.8 $\mu$S/cm, less than 0.7 $\mu$S/cm, less than 0.6 $\mu$S/cm, or less than 0.5 $\mu$S/cm, less than 0.4 $\mu$S/cm, less than 0.3 $\mu$S/cm, less than 0.2 $\mu$S/cm, or even less than 0.1 $\mu$S/cm. In one or more embodiments, the water 120 may have a conductivity from 0 $\mu$S/cm to 10 $\mu$S/cm.

In one or more embodiments, the water 120 may have a sodium content of less than 50 micrographs/liter ($\mu$g/L). For example, without limitation the water 120 may have a sodium content of less than 50 $\mu$g/L, less than 40 $\mu$g/L, less than 30 $\mu$g/L, less than 20 $\mu$g/L, less than 10 $\mu$g/L, less than 5 $\mu$g/L, less than 4 $\mu$g/L, less than 3 $\mu$g/L, less than 2 $\mu$g/L or even less than 1 $\mu$g/L. In one or more embodiments, the water 120 may have a sodium content from 0 $\mu$g/L to 50 $\mu$g/L, or even from 0 $\mu$g/L to 1 $\mu$g/L.

In one or more embodiments, the water 120 may have a silica content of less than 30 $\mu$g/L. For example, without limitation, the water 120 may have a silica content of less than 30 $\mu$g/L, less than 20 $\mu$g/L, less then 10 $\mu$g/L, less than 5 $\mu$g/L, less than 3 $\mu$g/L, less than 2 $\mu$g/L, or even less than 1 $\mu$g/L. In one or more embodiments, the water 120 may have a silica content of greater than or equal to 0 $\mu$g/L and less than or equal to 30 $\mu$g/L.

Without intending to be bound by theory, inorganic compounds may be precipitated from supercritical water due to a low dielectric content of supercritical water. Precipitated salts and silica may plug lines in process equipment and cause corrosion. Conductivity may indicate the concentration of inorganic compounds in the water.

The water 120 may be pressurized by a water pump 323 to form pressurized water 324. Water pump 323 may be any suitable pump for pressurizing water to a pressure above the critical pressure of water. For example, without limitation, the water pump 323 may be a plunger-type metering pump. In one or more embodiments, the pressure of the pressurized water 324 may be from 23 MPa to 30 MPa. For example, the pressure of the pressurized water 324 may be from 23 MPa to 30 MPa, from 25 MPa to 30 MPa, from 27 MPa to 30 MPa, from 29 MPa to 30 MPa, from 23 MPa to 28 MPa, from 23 MPa to 26 MPa, from 23 MPa to 24 MPa, or any combination or subset of these ranges.

The pressurized water 324 may be heated by a water preheater 333 to form supercritical water 334. The water preheater 333 may be any heater suitable to raise the temperature of the pressurized water 324 above the critical temperature of water. For example, the water preheater 333 may be a natural gas fired heater, a heat exchanger, or an electric heater. In one or more embodiments, the water preheater 333 may comprise multiple heaters in parallel, in series, or both. The temperature of the supercritical water 334 may be from 374° C. to 800° C. For example, the temperature of the supercritical water 334 may be from 374° C. to 800° C., from 400° C. to 800° C., from 450° C. to 800° C., from 500° C. to 800° C., from 550° C. to 800° C., from 600° C. to 800° C., from 650° C. to 800° C., from 700° C. to 800° C., from 750° C. to 800° C., from 374° C. to 750° C., from 374° C. to 700° C., from 374° C. to 650° C., from 374° C. to 600° C., from 374° C. to 550° C., from 374° C. to 500° C., from 374° C. to 450° C., from 374° C. to 400° C., or any combination or subset of these ranges.

Still referring to FIG. 3, the pitch emulsion 220 may be pressurized by a pitch emulsion pump 321 to form a pressurized pitch emulsion 322. Pitch emulsion pump 321 may be any suitable pump for pressurizing the pitch emulsion. For example, without limitation, the pitch emulsion pump 321 may be a plunger-type metering pump. In one or more embodiments, the pressure of the pressurized pitch emulsion 322 may be from 23 MPa to 30 MPa. For example, the pressure of the pressurized pitch emulsion 322 may be from 23 MPa to 30 MPa, from 25 MPa to 30 MPa, from 27 MPa to 30 MPa, from 29 MPa to 30 MPa, from 23 MPa to 28 MPa, from 23 MPa to 26 MPa, from 23 MPa to 24 MPa, or any combination or subset of these ranges.

The pressurized pitch emulsion 322 may be heated in a pitch emulsion preheater 331 to form a pressurized, heated pitch emulsion 332. The pitch emulsion preheater 331 may be any heater suitable to increase the temperature of the pressurized pitch emulsion 322. For example, the pitch emulsion preheater 331 may be a natural gas fired heater, a heat exchanger, or an electric heater. The temperature of the pressurized, heated pitch emulsion 332 may be from 100° C. to 350° C. For example, the temperature of the pressurized, heated pitch emulsion 332 may be from 100° C. to 350° C., from 150° C. to 350° C., from 200° C. to 350° C., from 250° C. to 350° C., from 300° C. to 350° C., from 100° C. to 300° C., from 100° C. to 250° C., from 100° C. to 200° C., from 100° C. to 150° C., or any combination or subset of these ranges.

Still referring to FIG. 3, the supercritical water 334 and the pressurized, heated pitch emulsion 332 may be mixed in a mixer 340 to create a mixed stream 342. The mixer 340 may be any type of mixing device suitable to mix the supercritical water 334 and the pressurized, heated pitch emulsion 332. For example, without limitation, the mixer 340 may comprise a static mixer, an inline mixer, an impeller-embedded mixer, a CSTR-type mixer, an ultrasonic mixer, a combination of these, or any other suitable mixer.

The mixed stream 342 may be passed from the mixer 340 to the supercritical water gasification reactor 350. The operating temperature and pressure of the supercritical water gasification reactor 350 may be above the critical temperature and the critical pressure of water. In one or more embodiments, the operating temperature of the supercritical water gasification reactor 350 is from 450° C. to 800° C. In one or more embodiments, the operating temperature of the supercritical water gasification reactor 350 is from 500° C. to 700° C. In one or more embodiments, the mixed stream 342 may be heated between the mixer 340 and the supercritical water gasification reactor 350 so that the operating conditions of the supercritical water gasification reactor 350 may be maintained.

In one or more embodiments, the supercritical water gasification reactor 350 may comprise a tubular reactor or a tank-type reactor. In one or more embodiments, the supercritical water gasification reactor 350 may comprise a tubular reactor oriented vertically, horizontally, in an inclined position or in a declined position.

The supercritical water gasification reactor 350 may be sized so that the residence time of water at the reaction condition flowing through the supercritical water gasification reactor 350 may be from 0.03 minutes (min.) to 10 min. For example, without limitation, the residence time of water at the reaction condition flowing through the supercritical water reactor 350 may be from 0.03 min. to 10 min., from 0.1 min. to 10 min., from 0.5 min. to 10 min., from 1 min. to 10 min., from 2 min to 10 min., from 4 min. to 10 min., from 6 min. to 10 min., from 8 min. to 10 min., from 0.03 min. to 8 min., from 0.03 min. to 6 min., from 0.03 min. to 4 min., from 0.03 min. to 2 min., from 0.03 min. to 1 min., from 0.03 min. to 0.5 min., from 0.03 min. to 0.1 min., or any combination or subset of these ranges. In one or more embodiments, the supercritical water gasification reactor 350 may be sized so that the residence time of supercritical water flowing through the supercritical water reactor 350 may be from 10 seconds to 2 min.

In one or more embodiments, the supercritical water gasification reactor 350 may be sized so that the Reynolds number of supercritical water flowing through the reactor is greater than 6000. For example, without limitation, the supercritical water gasification reactor 350 may be sized so that the Reynolds number of water flowing through the reactor at the reaction condition is greater than 6000, 7000, 8000, or even 9000. In one or more embodiments, the supercritical water gasification reactor 350 may be sized so that the Reynolds number of water flowing through the reactor at the reaction condition is from 6000 to 1,000,000. For example, the Reynolds number of water flowing through the reactor at the reaction condition may be from 6000 to 1,000,000, from 10,000 to 1,000,000, from 50,000 to 1,000,000, from 100,000 to 1,000,000, from 250,000 to 1,000,000, from 500,000 to 1,000,000, from 750,000 to 1,000,000, from 6,000 to 750,000, from 6,000 to 500,000, from 6,000 to 250,000, from 6,000 to 100,000, from 6,000 to 50,000, from 6,000 to 10,000, or any combination or subset of these ranges. In one or more embodiments, the supercritical water gasification reactor 350 may be sized so that the Reynolds number of water flowing through the reactor at the reaction condition is from 6,000 to 120,000.

The hydrocarbons in the mixed stream 342 may undergo one or more reactions in the supercritical water gasification reactor 350. In one or more embodiments, the hydrocarbons in the mixed stream 342 may undergo a reforming reaction such that CO, $CO_2$, and hydrogen are produced. In one or more embodiments, the reforming reaction may be the dominant reaction taking place in the supercritical water gasification reactor 350. In one or more embodiments, one or more of cracking, isomerizing, dealkylating, desulfurizing, demetallizing, denitrogenating, deoxygenating, dimerizing, and alkylating reactions may also take place in the supercritical water gasification reactor 350.

Still referring to FIG. 3, the product 352 from the supercritical water gasification reactor 350 may be passed to a cooling device 360 to form a cooled product 362. The cooling device 360 may be any cooler operable to cool the product 352 from the supercritical water gasification reactor 350. For example, without limitation, the cooling device 360 may comprise an air cooler, a heat exchanger, a water cooler, or any other cooling device. The cooled product 362 may have a temperature less than the critical temperature of water. In one or more embodiments, the cooled product 362 may have a temperature from 50° C. to 374° C. For example, the cooled product 362 may have a temperature from 50° C. to 374° C., from 50° C. to 350° C., from 50° C. to 300° C., from 50° C. to 250° C., from 50° C. to 200° C., from 50° C. to 150° C., from 50° C. to 100° C., from 100° C. to 374° C., from 150° C. to 374° C., from 200° C. to 374° C., from 250° C. to 374° C., from 300° C. to 374° C., from 350° C. to 374° C., or any combination or subset of these ranges.

The cooled product 362 may be passed from the cooling device 360 to a depressurizing device 370. The depressurizing device 370 may be operable to reduce the pressure of the cooled product 362 to form the gasified product 310. In one or more embodiments, the depressurizing device 370 may comprise a pressure regulator, a pressure control valve, or any other suitable means for regulating pressure. In one or more embodiments, the gasified product 310 may have a pressure of less than 21 MPa. In one or more embodiments, the gasified product 310 may have a pressure from 0.01 MPag to 5 MPag. For example, gasified product 310 may have a pressure from 0.01 MP ag to 5 MP ag, from 0.1 MP ag to 5 MP ag, from 0.5 MP ag to 5 MP ag, from 1 MPag to 5 MPag, from 2 MPag to 5 MPag, from 3 MPag to 5 MPag, from 4 MPag to 5 MPag, from 0.01 MPag to 4 MPag, from 0.01 MPag to 3 MPag, from 0.01 MPag to 2 MPag, from 0.01 MPag to 1 MPag, from 0.01 MPag to 0.5 MPag, from 0.01 MPag to 0.1 MPag, or any combination or subset of these ranges.

It should be understood that the supercritical water gasification unit 300 depicted in FIG. 3 is merely one embodiment of a supercritical water gasification unit 300 that may be utilized in the system 100 for processing a hydrocarbon feedstock described in the present disclosure. It is contemplated that variations on the supercritical water gasification unit 300 depicted in FIG. 3 may also be suitable for use in the system 100 for processing a hydrocarbon feedstock described herein. Furthermore, it should be understood that the system 100 for processing a hydrocarbon feedstock described herein is not necessarily limited to the use of the exact supercritical water gasification unit 300 depicted in FIG. 3.

Referring again to FIG. 1, the system 100 for processing a hydrocarbon feedstock may comprise a degassing unit 400 in fluid communication with the supercritical water gasification unit 300. The degassing unit 400 may be configured to separate the gasified product 310 into at least a product gas 410 and a product emulsion 420.

In one or more embodiments, the degassing unit 400 may comprise multiple separators including but not limited to gas/liquid separators and solid/liquid separators. The separators may be operable to separate product gas 410 from the product emulsion 420 and solids from the product emulsion 420.

Referring now to FIG. 4, an embodiment of degassing unit 400 of FIG. 1 is depicted in greater detail. The degassing unit 400 may comprise a gas/liquid separator 430. The gas/liquid separator 430 may be operable to separate product gas 410 from emulsion 432. The gas/liquid separator 430 may be any separator suitable for separating the product gas 410 from the emulsion 432. In one or more embodiments, the gas liquid separator 430 may comprise a flash drum or a flash vessel.

The degassing unit 400 may comprise a solid/liquid separator 440. The solid/liquid separator 440 may be in fluid communication with the gas/liquid separator 430, and the solid/liquid separator 440 may be any separator suitable for separating solids 442 from the emulsion 432 to form the product emulsion 420. The solid/liquid separator may comprise a vessel having internal baffles and/or weirs to separate the solids and liquids. In one or more embodiments, the solids 442 may comprise coke. Without intending to be bound by theory, coke and inorganic oxides, such as iron, nickel, and vanadium oxides, may be formed due to the high temperature of the supercritical water gasification unit. The iron, nickel, and vanadium oxides may be formed from iron, nickel and vanadium compounds present in the hydrocarbon feedstock 110.

It should be understood that the degassing unit 400 depicted in FIG. 4 is merely one embodiment of a degassing unit 400 that may be utilized in the system 100 for processing a hydrocarbon feedstock described in the present disclosure. It is contemplated that variations on the degassing unit 400 depicted in FIG. 4 may also be suitable for use in the system 100 for processing a hydrocarbon feedstock described herein. Furthermore, it should be understood that the system 100 for processing a hydrocarbon feedstock described herein is not necessarily limited to the use of the exact degassing unit 400 depicted in FIG. 4.

In one or more embodiments, the product emulsion 420 may comprise hydrocarbons and water in an emulsion. In one or more embodiments, the product emulsion 420 may comprise an water-in-oil emulsion, where hydrocarbons (oil) are the continuous phase and water is the dispersed phase. In one or more embodiments, the product emulsion 420 may comprise an oil-in-water-in-oil emulsion where hydrocarbons (oil) are the continuous phase, water is dispersed in the continuous hydrocarbon phase, and hydrocarbons are dispersed in the water.

In one or more embodiments, at least a portion of the product emulsion 420a may be passed to the supercritical carbon dioxide extraction unit 200 to break the emulsion. As previously discussed, contacting an emulsion with supercritical carbon dioxide may break the emulsion. Without intending to be bound by theory, contacting the product emulsion 420a with supercritical carbon dioxide in the supercritical carbon dioxide extraction unit 200 may allow for the simultaneous breaking of the product emulsion 420a along with the extraction of light hydrocarbons from the product emulsion 420a. Furthermore, water from the broken product emulsion 420a may be passed from the supercritical carbon dioxide extraction unit 200 with the pitch emulsion 220 to the supercritical water gasification unit 300. This may reduce the amount of water 120 required by the supercritical water gasification unit 300 as water may be recycled to the supercritical gasification unit 300 from product emulsion 420a.

In one or more embodiments, at least 50% by mass of the product emulsion 420 may be recycled to the supercritical carbon dioxide extraction unit 200 as product emulsion 420a. For example, from 50% to 100%, from 60% to 100%, from 70% to 100%, from 80% to 100%, from 90% to 100%, from 50% to 90%, from 50% to 80%, from 50% to 70%, from 50% to 60%, or any combination or subset of these ranges of the product emulsion 420 may be recycled to the supercritical carbon dioxide extraction unit 200. In one or more embodiments, substantially all of the product emulsion 420 may be recycled to the supercritical carbon dioxide extraction unit 200. Without intending to be bound by theory, when substantially all of the product emulsion 420 is recycled to the supercritical carbon dioxide extraction unit 200 the need for additional separation equipment to break the product emulsion downstream from the supercritical water gasification unit 300 may be eliminated. In embodiments where a portion of the product emulsion 420 is recycled, the scale of separation equipment needed to break the emulsion of the non-recycled portion of the product emulsion 420b may be reduced relative to systems in which none of the product emulsion 420 is recycled.

In one or more embodiments, the product gas 410 may comprise one or more of $H_2$, CO, $CO_2$, $H_2S$, $NH_3$, $C_1$ hydrocarbons, $C_2$ hydrocarbons, $C_3$ hydrocarbons, $C_4$ hydrocarbons, $C_5$ hydrocarbons, $C_6$ hydrocarbons, $C_7$ hydrocarbons, and $C_8$ hydrocarbons. In one or more embodiments, the product gas 410 may be passed to a gas separator 500. The gas separator 500 may be configured to separate various gasses from the product gas 410.

Referring again to FIG. 4, the gas separator 500 may comprise a hydrocarbon separator 540. The hydrocarbon separator 540 may be operable to separate the $C_1$ to $C_8$ hydrocarbons from the product gas 410 to form a light hydrocarbon stream 530 from gas stream 542. In one or more embodiments, the hydrocarbon separator 540 may be an adsorption type separator, a cryogenic type separator, or a distillation type separator.

The gas separator 500 may comprise a scrubber 550. The scrubber 550 may be operable to remove $H_2S$ 554 from gas stream 542 to form a desulfurized gas stream 552. The scrubber 550 may comprise an alkaline solution type scrubber, an adsorption type scrubber, or any other suitable scrubber.

The gas separator 500 may comprise a hydrogen separator 560. The hydrogen separator may be operable to separate hydrogen 510 from the desulfurized gas stream 552 to from a gas stream 562. In one or more embodiments, the hydrogen 510 may be substantially free from other gases. The hydrogen separator 560 may be a membrane type separator, a pressure swing adsorption (PSA) type separator, or any other suitable separator. In one or more embodiments, at least a portion of the hydrogen 510 may be used as a feedstock in one or more processes included in a refinery 700. For example, without limitation, hydrogen 510 may be passed to a hydroprocessing unit in refinery 700.

The gas separator 500 may comprise a carbon dioxide capturing unit 570. The carbon dioxide capturing unit 570 may be any system or unit operable to separate carbon dioxide 520 from the gas stream 562 to form gas stream 572. In one or more embodiments, the carbon dioxide capturing unit 570 may comprise a membrane type unit, an adsorption type unit, or any other suitable type of separator. In one or more embodiments, gas stream 572 may be passed to a treatment unit (not depicted) for appropriate treatment before being released to the atmosphere. In one or more embodiments, the carbon dioxide 520 may be substantially free from other gases. In one or more embodiments, at least a portion of the carbon dioxide 520 recovered from the carbon dioxide capturing unit 570 of the gas separator 500 may be recycled to the supercritical carbon dioxide extraction unit 200.

EXAMPLES

The various embodiments of methods and systems for processing hydrocarbon feedstocks will be further clarified by the following examples. The examples are illustrative in nature, and should not be understood to limit the subject matter of the present disclosure.

Example 1—System for Processing Hydrocarbon Feedstocks

Figure 5:
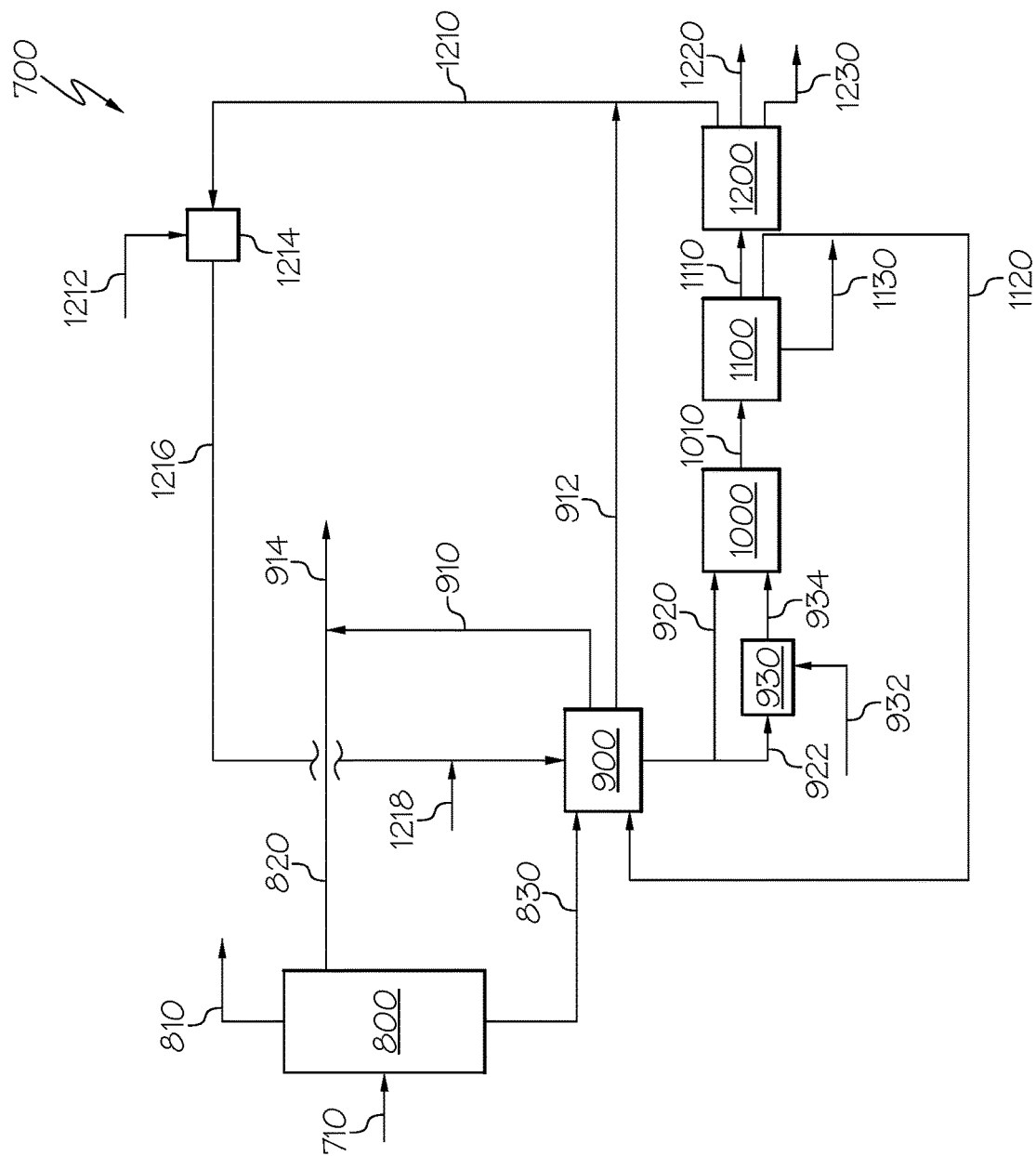
FIG. 5 schematically depicts a system for processing a hydrocarbon feedstock according to the embodiment of Example 1, described herein.

An exemplary system 700 for processing hydrocarbon feedstocks is depicted in FIG. 5. The system 700 depicted in FIG. 5 was modeled for processing 20,000 barrels per day of crude oil 710. The properties of crude oil 710 are included in Table 1. The crude oil 710 was fractionated in a fractionator 800 to form liquefied petroleum gas (LPG) 810, distillate 820, and residue 830. The fractionator 800 included an atmospheric distillation column and a vacuum distillation column. The distillate 820 was a combination of multiple distillate streams including naphtha, kerosene, gas oil, and vacuum gas oil. In this example, the distillate streams are collectively referred to as distillate 820. The residue 830 from the fractionator 800 is passed to a supercritical carbon dioxide extraction unit 900. The properties of residue 830 are included in Table 1. The supercritical carbon dioxide extraction unit 900 formed an extract 910, carbon dioxide 912, pitch 920, and water 922. The extract 910 was combined with the distillate 820 to form a feedstock 914 to a refinery. The flow rate of refinery feedstock 914 was about 182,000 barrels per day. The properties of the refinery feedstock 914 are included in Table 1. The loss of about 18,000 barrels per day may be a result of the supercritical water gasification process, where $H_2$ and $CO_2$ were produced along with coke.

TABLE 1

Feed and Product Properties

| | Crude Oil 710 | Residue 830 | Extract 910 | Pitch 920 | Input to Refinery 914 |
|---|---|---|---|---|---|
| Specific Gravity (API)[Degrees] | 31.3 | 5.4 | 20.8 | 3.2 | 37.4 |
| Asphaltene Content [wt. %] | 2.1 | 6.6 | 1.7 | 7.6 | 0.6 |
| Conradson Carbon Content [wt. %] | 6.3 | 21.1 | 10.4 | 24.4 | 2.5 |
| Sulfur [wt. %] | 2.5 | 5.2 | 1.8 | 5.5 | 1.4 |
| Aromatics [vol. %] | 38.5 | 68.8 | 21.0 | 69.8 | 32.8 |
| TBP 5% [° C.] | 34.3 | 534.8 | 79.0 | 547.8 | 33.2 |
| TBP 10% [° C.] | 90.1 | 544.7 | 124.2 | 561.4 | 70.4 |
| TBP 30% [° C.] | 205.5 | 579.8 | 340.2 | 604.1 | 179.5 |
| TBP 50% [° C.] | 319.9 | 618.1 | 538.9 | 645.3 | 279.6 |
| TBP 70% [° C.] | 483.1 | 667.9 | 588.0 | 685.2 | 384.4 |
| TBP 90% [° C.] | 639.0 | 1025.7 | 829.1 | 1042.2 | 541.5 |
| TBP 95% [° C.] | 699.9 | 1058.1 | 1037.3 | 1073.0 | 605.4 |

Still referring to FIG. 5, the pitch 920 was passed to a supercritical water gasification unit 1000. Water 922 was treated by a reverse osmosis membrane and an ion exchange bed to remove impurities. The water 922 was mixed with make-up water 932 in mixer 930 to form feed water 934, which was passed to the supercritical water gasification unit 1000. Make-up water 932 was demineralized water. The supercritical water gasification product 1010 was passed from the supercritical water gasification unit 1000 to degassing unit 1100. Degassing unit 1100 separated the supercritical water gasification product 1010 into product gases 1110, a product emulsion 1120, and pitch 1130. The product emulsion 1120 was recycled to the supercritical carbon dioxide extraction unit 900. The product gasses 1110 were passed to gas separation unit 1200. The product gasses 1110 were separated in to carbon dioxide 1210, hydrogen 1220, and other gasses 1230. The carbon dioxide 1210 was recycled to the supercritical carbon dioxide extraction unit 900. Additionally, make-up carbon dioxide 1212 was added to carbon dioxide 1210 in mixer 1214 to form carbon dioxide stream 1216. An additive 1218 was added to the carbon dioxide 1216 before the carbon dioxide 1216 was passed to the supercritical carbon dioxide extraction unit 900.

The mass and volume flow rates of the streams depicted in FIG. 5 are included in Table 2.

TABLE 2

Mass and Volume Flow Rate of Streams Depicted in FIG. 5

| Name | Crude Oil 710 | LPG 810 | Distillate 820 | Residue 830 |
|---|---|---|---|---|
| Mass Flow [tonne/d] | 27,602 | 784 | 18,732 | 8,086 |
| Liquid Volume Flow [barrel/day] | 200,000 | | 142,386 | 49,265 |

| Name | $CO_2$ 1216 | Additive 1218 | Product Emulsion 1120 | Extract 910 |
|---|---|---|---|---|
| Mass Flow [tonne/d] | 242,572 | 81 | 60,228 | 5,800 |
| Liquid Volume Flow [barrel/day] | | 584 | 382,060 | 39,305 |

| Name | Pitch 920 | Water 922 | $CO_2$ 912 | Make-up Water 932 |
|---|---|---|---|---|
| Mass Flow [tonne/d] | 5,761 | 57,075 | 242,331 | 946 |
| Liquid Volume Flow [barrel/day] | 34,534 | 359,717 | | 5,960 |

| Name | Feed Water 934 | SCWG Product 1010 | Gas Product 1110 | Coke 1130 |
|---|---|---|---|---|
| Mass Flow [tonne/d] | 58,021 | 63,782 | 2,749 | 805 |
| Liquid Volume Flow [barrel/day] | 365,677 | 426,982 | | |

| Name | $CO_2$ 1210 | Hydrogen 1220 | Other Gases 1230 |
|---|---|---|---|
| Mass Flow [tonne/d] | 242,412 | 4 | 2,664 |
| Liquid Volume Flow [barrel/day] | | | |

| Name | Make-up $CO_2$ 1212 | Refinery Feedstock 914 |
|---|---|---|
| Mass Flow [tonne/d] | 160 | 24,532 |
| Liquid Volume Flow [barrel/day] | | 181,850 |

Example 2—Supercritical Carbon Dioxide Extraction Unit

Figure 6:
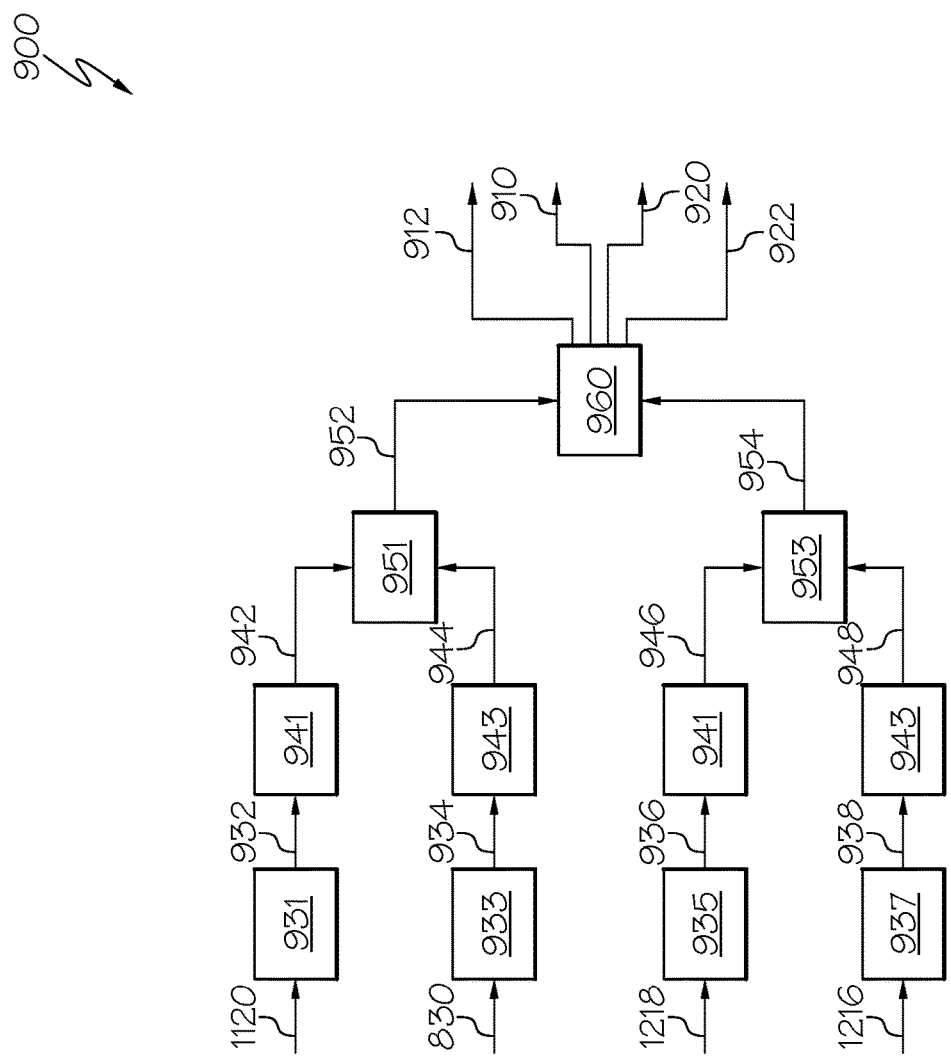
FIG. 6 schematically depicts a supercritical carbon dioxide extraction unit according to the embodiment of Example 2, described herein.

The supercritical carbon dioxide extraction unit 900 of Example 1 is depicted in greater detail in FIG. 6. Referring now to FIG. 6, carbon dioxide 1216 and additive 1218 were compressed in pump 937 and pump 935, respectively, to form pressurized carbon dioxide 938 and pressurized additive 936. The pressurized carbon dioxide 938 and the pressurized additive 936 were preheated in preheater 943 and preheater 941, respectively, to form supercritical carbon dioxide 948 and heated, pressurized additive 946. The supercritical carbon dioxide 948 and heated, pressurized additive 946 were mixed in mixer 953 to form supercritical carbon dioxide solvent 954.

Still referring to FIG. 6, the product emulsion 1120 and the residue 830 were pressurized in pump 931 and pump 933 respectively to form pressurized product emulsion 932 and pressurized residue 934. The pressurized product emulsion 932 and the pressurized residue 934 were heated in preheater 941 and preheater 943 respectively to form heated, pressurized product emulsion 942 and heated, pressurized residue 944. The temperature of the heated, pressurized product emulsion 942 was slightly greater than the temperature of the heated, pressurized residue 944 to maintain the homogeneity of the heated, pressurized product emulsion 942. The heated, pressurized product emulsion 942 and the heated, pressurized residue 944 were combined in mixer 951 to for extractor feed 952.

Extractor feed 952 and supercritical carbon dioxide solvent 954 were passed to the extractor 960. The extractor 960 was a tower-type extraction column having a tray and packing internal structure. The extractor 960 also included oil/water separation vessels. The extractor 960 produced carbon dioxide 912, extract 910, pitch 920, and water 922. Recovery of carbon dioxide and water was about 92% and 99% respectively.

The mass flow, volume flow, pressure, and temperature of each stream depicted in FIG. 6 is given in Table 3.

TABLE 3

Properties of Streams Depicted in FIG. 6

| Name | Product Emulsion 1120 | Pres. Emulsion 932 | Pres., Heated Emulsion 942 | Residue 830 | Pres. Residue 934 | Pres., Heated Residue 944 |
|---|---|---|---|---|---|---|
| Temperature [C.] | 30 | 31 | 80 | 190 | 191 | 55 |
| Pressure [bar_g] | 2 | 150 | 150 | 2 | 150 | 150 |
| Mass Flow [tonne/d] | 60228 | 60228 | 60228 | 8086 | 8086 | 8086 |
| Volume Flow [barrel/day] | 382060 | 382060 | 382060 | 49265 | 49265 | 49265 |

| Name | Additive 1218 | Pres. Additive 936 | Pres. Heated Additive 946 | $CO_2$ 1216 | SC $CO_2$ 948 |
|---|---|---|---|---|---|
| Temperature [C.] | 20 | 25 | 50 | 20 | 50 |
| Pressure [bar_g] | 20 | 150 | 150 | 2 | 150 |
| Mass Flow [tonne/d] | 81 | 81 | 81 | 242572 | 242572 |
| Volume Flow [barrel/day] | 584 | 584 | 584 | | |

TABLE 3-continued

Properties of Streams Depicted in FIG. 6

| Name | Extractor Feed 952 | Extractor Solvent 954 | $CO_2$ 912 | Extract 910 | Pitch 920 | Water 922 |
|---|---|---|---|---|---|---|
| Temperature [C.] | 79 | 50 | 20 | 20 | 130 | 20 |
| Pressure [bar_g] | 150 | 150 | 2 | 2 | 2 | 2 |
| Mass Flow [tonne/d] | 68313 | 242653 | 223166 | 5550 | 5761 | 57075 |
| Volume Flow [barrel/day] | 431326 | 1849200 | | 37611 | 34534 | 359717 |

Example 3—Supercritical Water Gasification Unit

Figure 7:
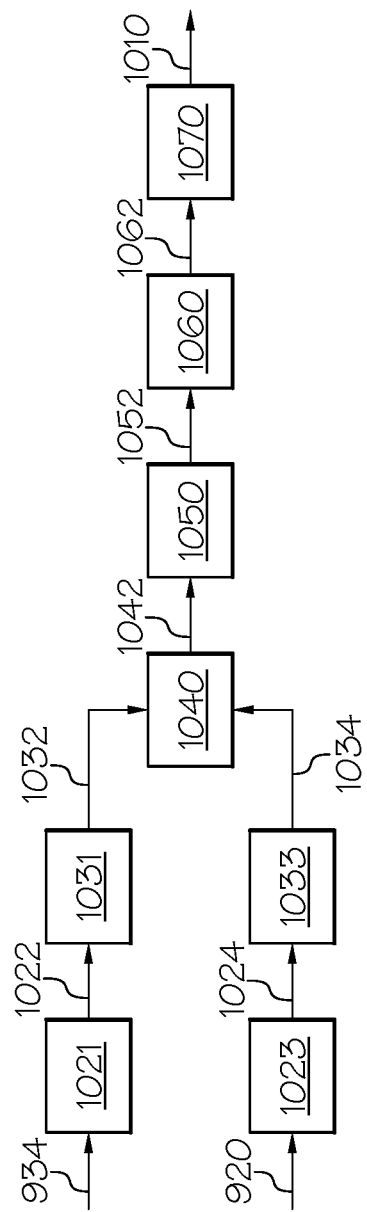
FIG. 7 schematically depicts a supercritical water gasification unit according to the embodiment of Example 3, described herein.

The supercritical water gasification unit 1000 of Example 1 is depicted in greater detail in FIG. 7. Referring now to FIG. 7, feed water 934 and pitch 920 were pressurized in pump 1021 and pump 1023 respectively to form pressurized water 1022 and pressurized pitch 1024, each having a pressure of 250 Barg. The pressurized water 1022 and pressurized pitch 1024 were heated in preheater 1031 and preheater 1033 respectively to form supercritical water 1032 and heated, pressurized pitch 1034, having temperatures of 680° C. and 150° C. respectively. The ratio of the flow rates of feed water 934 to pitch 920 was about 10 to 1 on a mass flow basis at standard ambient temperature and pressure. The supercritical water 1032 and the heated, pressurized pitch 1034 were mixed in mixer 1040 to form a mixed stream 1042. The mixed stream 1042 was passed to the supercritical water gasification reactor 1050. The supercritical water gasification reactor 1050 was a tubular-type reaction sized to have a residence time of 62 seconds and a Reynolds number of 12,500 for a fluid comprising 100% water. The reactor effluent 1052 was cooled in heat exchanger 1060. The cooled effluent 1062 was depressurized by being passed through valve 1070 to form supercritical water gasification product 1010. The product distribution of the supercritical water gasification product 1010 are listed in Table 4. The product distribution in Table 4 excludes water from the product distribution; however, Table 4 does indicate the amount of water consumed by the supercritical water gasification process. Additionally, the compositions of the pitch 920 and the supercritical water gasification product 1010 are listed in Table 5.

TABLE 4

Product Distribution of Supercritical Water Gasification Product 1010
Distribution of Product (other than water)(mass)

| Product Oil | 0.47 |
|---|---|
| Product Gas | 0.41 |
| Coke Product | 0.12 |
| Feed Water Consumption | 16.4 wt % |

TABLE 5

Supercritical Water Gasification Feed and Product Compositions

| | Pitch 920 | SCWG Product 1010 |
|---|---|---|
| Specific Gravity (API)[Degrees] | 3.2 | 27.8 |
| Asphaltene Content [wt. %] | 7.6 | 1.2 |
| Conradson Carbon Content [wt. %] | 24.4 | 8.6 |
| Sulfur [wt. %] | 5.5 | 3.2 |
| Aromatics [vol. %] | 69.8 | 82.1 |
| TBP 5% [° C.] | 547.8 | 58.6 |
| TBP 10% [° C.] | 561.4 | 88.3 |
| TBP 30% [° C.] | 604.1 | 216.8 |
| TBP 50% | 645.3 | 355.2 |
| TBP 70% [° C.] | 685.2 | 539.6 |
| TBP 90% [° C.] | 1042.2 | 1026.5 |
| TBP 95% [° C.] | 1073.0 | 1058.8 |

According to a first aspect of the present disclosure, a method for processing a hydrocarbon feedstock comprises contacting the hydrocarbon feedstock and a product emulsion with supercritical carbon dioxide in a supercritical carbon dioxide extraction unit to form at least an extract emulsion and a pitch emulsion; contacting at least a portion of the pitch emulsion with supercritical water in a supercritical water gasification unit to form a gasified product; separating the gasified product into at least a product gas and the product emulsion, the product emulsion comprising water and one or more hydrocarbons; and recycling at least a portion of the product emulsion to the supercritical carbon dioxide extraction unit, wherein contacting the product emulsion with the supercritical carbon dioxide breaks at least a portion of the product emulsion.

A second aspect of the present disclosure may include the first aspect, wherein the method further comprises separating the one or more gasses into at least hydrogen, carbon dioxide, and light hydrocarbons.

A third aspect of the present disclosure may include the second aspect, wherein the method further comprises passing at least a portion of the carbon dioxide to the supercritical carbon dioxide extraction unit.

A fourth aspect of the present disclosure may include either the second or third aspect, wherein the method further comprises passing at least a portion of the hydrogen to a refinery.

A fifth aspect of the present disclosure may include any of the first through fourth aspects, wherein the method further comprises separating at least a portion of the extract emulsion into at least an aqueous stream, liquid hydrocarbons, and carbon dioxide.

A sixth aspect of the present disclosure may include the fifth aspect, wherein the method further comprises passing at least a portion of the liquid hydrocarbons to a refinery.

A seventh aspect of the present disclosure may include any of the first through sixth aspects, wherein the hydrocarbon feedstock comprises hydrocarbons derived from petroleum, coal, biomass, or plastic.

An eighth aspect of the present disclosure may include any of the first through seventh aspects, wherein the hydrocarbon feedstock comprises greater than or equal to 0.1 wt. % asphaltene.

A ninth aspect of the present disclosure may include any of the first through eighth aspects, wherein the hydrocarbon feedstock has an API gravity from −5° to 50°.

A tenth aspect of the present disclosure may include any of the first through ninth aspects, wherein contacting the hydrocarbon feedstock and the product emulsion with the supercritical carbon dioxide occurs at a pressure from 7.5 MPag to 15 MPag and at a temperature from 35° C. to 250° C.

An eleventh aspect of the present disclosure may include any of the first through tenth aspects, wherein the extract emulsion comprises less than or equal to 1 wt. % asphaltene.

A twelfth aspect of the present disclosure may include any of the first through eleventh aspects, wherein the pitch emulsion comprises greater than or equal to 1 wt. % asphaltene.

A thirteenth aspect of the present disclosure may include any of the first through twelfth aspects, wherein the pitch emulsion is contacted with supercritical water at a temperature from 450° C. to 800° C. and at a pressure from 23 MPa to 30 MPa.

A fourteenth aspect of the present disclosure may include any of the first through thirteenth aspects, wherein the product gas comprises one or more of $H_2$, CO, $CO_2 H_2S$, $NH_3$, $C_1$ hydrocarbons, $C_2$ hydrocarbons, $C_3$ hydrocarbons, $C_4$ hydrocarbons, $C_5$ hydrocarbons, $C_6$ hydrocarbons, $C_7$ hydrocarbons, and $C_8$ hydrocarbons.

A fifteenth aspect of the present disclosure may include any of the first through fourteenth aspects, wherein at least 50 wt. % of the product emulsion is recycled to the supercritical water extraction unit.

According to a sixteenth aspect of the present disclosure, a system for processing a hydrocarbon feedstock comprises a supercritical carbon dioxide extraction unit configured to contact a hydrocarbon feedstock with supercritical carbon dioxide to form at least an extract emulsion and a pitch emulsion; a supercritical water gasification unit in fluid communication with the supercritical carbon dioxide extraction unit, the supercritical water gasification unit configured to contact the pitch emulsion with supercritical water to form a gasified product; and a degassing unit in fluid communication with the supercritical water gasification unit, the degassing unit configured to separate the gasified product into at least a product gas and a product emulsion, wherein the degassing unit is in fluid communication with the supercritical carbon dioxide extraction unit such that at least a portion of the product emulsion is recycled to the supercritical carbon dioxide extraction unit.

A seventeenth aspect of the present disclosure may include the sixteenth aspect, wherein the supercritical carbon dioxide extraction unit comprises: a carbon dioxide pump configured to pressurize carbon dioxide to a pressure greater than the critical pressure of carbon dioxide to form a pressurized carbon dioxide; a carbon dioxide preheater configured to heat the pressurized carbon dioxide to a temperature greater than the critical temperature of carbon dioxide to form the supercritical carbon dioxide; a feedstock pump configured to pressurize the hydrocarbon feedstock to form a pressurized feedstock; a feedstock preheater configured to heat the pressurized feedstock to form a heated, pressurized feedstock; an emulsion pump configured to pressurize the product emulsion to form a pressurized emulsion; an emulsion preheater configured to heat the pressurized emulsion to form a heated, pressurized emulsion; and an extractor configured to contact the supercritical carbon dioxide with the heated, pressurized feedstock and the heated pressurized emulsion.

An eighteenth aspect of the present disclosure may include either the sixteenth aspect or the seventeenth aspect, wherein the supercritical water gasification unit comprises: a water pump configured to pressurize water to a pressure greater than the critical pressure of water to form pressurized water; a water preheater configured to heat the pressurized water to a temperature greater than the critical temperature of water to form supercritical water; a pitch emulsion pump configured to pressurize the pitch emulsion to form a pressurized pitch emulsion; a pitch emulsion preheater configured to heat the pressurized pitch emulsion to form a heated, pressurized pitch emulsion; a supercritical water gasification reactor configured to contact the supercritical water and the heated, pressurized pitch emulsion to form a product; a cooling device configured to cool the product; and a depressurizing device configured to reduce the pressure of the cooled product to form the gasified product.

A nineteenth aspect of the present disclosure may include any of the sixteenth through eighteenth aspects, wherein the degassing unit comprises: a gas/liquid separator configured to separate the gasified product into a product gas and an emulsion; and a solid/liquid separator configured to separate solids from the emulsion to form the product emulsion.

A twentieth aspect of the present disclosure may include any of the sixteenth through nineteenth aspects, wherein the system further comprises a gas separation unit, the gas separation unit comprising: a hydrogen separator configured to separate hydrogen from the product gas; and a carbon dioxide capturing unit configured to separate carbon dioxide from the product gas, wherein the gas separation unit is in fluid communication with the supercritical carbon dioxide extraction unit such that carbon dioxide may be passed from the carbon dioxide capturing unit to the supercritical carbon dioxide extraction unit.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a stream or in a reactor should be appreciated as containing, in some embodiments, a mixture of isomers of that constituent. For example, a compositional range specifying butene may include a mixture of various isomers of butene. It should be appreciated that the examples supply compositional ranges for various streams, and that the total amount of isomers of a particular chemical composition can constitute a range.

The invention claimed is:

1. A method for processing a hydrocarbon feedstock, the method comprising:
    contacting the hydrocarbon feedstock and a product emulsion with supercritical carbon dioxide in a supercritical carbon dioxide extraction unit to form at least an extract emulsion and a pitch emulsion;
    contacting at least a portion of the pitch emulsion with supercritical water in a supercritical water gasification unit to form a gasified product;
    separating the gasified product into at least a product gas and the product emulsion, the product emulsion comprising water and one or more hydrocarbons; and
    recycling at least a portion of the product emulsion to the supercritical carbon dioxide extraction unit, wherein contacting the product emulsion with the supercritical carbon dioxide breaks at least a portion of the product emulsion.

2. The method of claim 1, further comprising separating the product gas into at least hydrogen, carbon dioxide, and hydrocarbons.

3. The method of claim 2, further comprising passing at least a portion of the carbon dioxide to the supercritical carbon dioxide extraction unit.

4. The method of claim 2, further comprising passing at least a portion of the hydrogen to a refinery.

5. The method of claim 1, further comprising separating at least a portion of the extract emulsion into at least an aqueous stream, liquid hydrocarbons, and carbon dioxide.

6. The method of claim 5, further comprising passing at least a portion of the liquid hydrocarbons to a refinery.

7. The method of claim 1, wherein the hydrocarbon feedstock comprises hydrocarbons derived from petroleum, coal, biomass, or plastic.

8. The method of claim 1, wherein the hydrocarbon feedstock comprises greater than or equal to 0.1 wt. % asphaltene.

9. The method of claim 1, wherein the hydrocarbon feedstock has an API gravity from −5° to 50°.

10. The method of claim 1, wherein contacting the hydrocarbon feedstock and the product emulsion with the supercritical carbon dioxide occurs at a pressure from 7.5 MPag to 15 MPag and at a temperature from 35° C. to 250° C.

11. The method of claim 1, wherein the extract emulsion comprises less than or equal to 1 wt. % asphaltene.

12. The method of claim 1, wherein the pitch emulsion comprises greater than or equal to 1 wt. % asphaltene.

13. The method of claim 1, wherein the pitch emulsion is contacted with supercritical water at a temperature from 450° C. to 800° C. and at a pressure from 23 MPa to 30 MPa.

14. The method of claim 1, wherein the product gas comprises one or more of $H_2$, CO, $CO_2 H_2 S$, $NH_3$, $C_1$ hydrocarbons, $C_2$ hydrocarbons, $C_3$ hydrocarbons, $C_4$ hydrocarbons, $C_5$ hydrocarbons, $C_6$ hydrocarbons, $C_7$ hydrocarbons, and $C_8$ hydrocarbons.

15. The method of claim 1, wherein at least 50 wt. % of the product emulsion is recycled to the supercritical water extraction unit.

16. A system for processing a hydrocarbon feedstock, the system comprising:
    a supercritical carbon dioxide extraction unit configured to contact a hydrocarbon feedstock with supercritical carbon dioxide to form at least an extract emulsion and a pitch emulsion;
    a supercritical water gasification unit in fluid communication with the supercritical carbon dioxide extraction unit, the supercritical water gasification unit configured to contact the pitch emulsion with supercritical water to form a gasified product; and
    a degassing unit in fluid communication with the supercritical water gasification unit, the degassing unit configured to separate the gasified product into at least a product gas and a product emulsion, wherein the degassing unit is in fluid communication with the supercritical carbon dioxide extraction unit such that at least a portion of the product emulsion is recycled to the supercritical carbon dioxide extraction unit.

17. The system of claim 16, wherein the supercritical carbon dioxide extraction unit comprises:
    a carbon dioxide pump configured to pressurize carbon dioxide to a pressure greater than the critical pressure of carbon dioxide to form a pressurized carbon dioxide;
    a carbon dioxide preheater configured to heat the pressurized carbon dioxide to a temperature greater than the critical temperature of carbon dioxide to form the supercritical carbon dioxide;
    a feedstock pump configured to pressurize the hydrocarbon feedstock to form a pressurized feedstock;
    a feedstock preheater configured to heat the pressurized feedstock to form a heated, pressurized feedstock;
    an emulsion pump configured to pressurize the product emulsion to form a pressurized emulsion;
    an emulsion preheater configured to heat the pressurized emulsion to form a heated, pressurized emulsion; and
    an extractor configured to contact the supercritical carbon dioxide with the heated, pressurized feedstock and the heated pressurized emulsion.

18. The system of claim 16, wherein the supercritical water gasification unit comprises:
    a water pump configured to pressurize water to a pressure greater than the critical pressure of water to form pressurized water;

a water preheater configured to heat the pressurized water to a temperature greater than the critical temperature of water to form supercritical water;

a pitch emulsion pump configured to pressurize the pitch emulsion to form a pressurized pitch emulsion;

a pitch emulsion preheater configured to heat the pressurized pitch emulsion to form a heated, pressurized pitch emulsion;

a supercritical water gasification reactor configured to contact the supercritical water and the heated, pressurized pitch emulsion to form a product;

a cooling device configured to cool the product; and a depressurizing device configured to reduce the pressure of the cooled product to form the gasified product.

19. The system of claim 16, wherein the degassing unit comprises:

a gas/liquid separator configured to separate the gasified product into a product gas and an emulsion; and a solid/liquid separator configured to separate solids from the emulsion to form the product emulsion.

20. The system of claim 16, further comprising a gas separation unit, the gas separation unit comprising:

a hydrogen separator configured to separate hydrogen from the product gas; and a carbon dioxide capturing unit configured to separate carbon dioxide from the product gas, wherein the gas separation unit is in fluid communication with the supercritical carbon dioxide extraction unit such that carbon dioxide may be passed from the carbon dioxide capturing unit to the supercritical carbon dioxide extraction unit.

* * * * *